United States Patent [19]

Green

[11] 4,059,919
[45] Nov. 29, 1977

[54] HEAT TREATING PARTICULATE MATERIAL

[75] Inventor: Joseph Green, Maidenhead, England

[73] Assignee: H. J. Heinz Company Limited, Middlesex, England

[21] Appl. No.: 680,419

[22] Filed: Apr. 26, 1976

[30] Foreign Application Priority Data

Apr. 25, 1975 United Kingdom ............... 17326/75

[51] Int. Cl.² .............................................. A01G 1/04
[52] U.S. Cl. .......................................... 47/1.1; 21/56; 23/290; 426/506; 426/509; 426/521; 426/519
[58] Field of Search ............... 426/506, 510, 507, 519, 426/511, 294, 523, 295, 521, 509, 520; 21/56, 94; 23/290; 99/483, 348, 536, 517; 47/1.1

[56] References Cited

U.S. PATENT DOCUMENTS

| | | | |
|---|---|---|---|
| 2,163,628 | 6/1939 | Pilkey | 426/507 X |
| 2,529,710 | 11/1950 | Singh | 426/521 X |
| 2,693,664 | 11/1954 | Szuecs | 47/1.1 |
| 2,850,841 | 9/1958 | Szuecs | 47/1.1 |
| 2,909,985 | 10/1959 | Abrams | 99/348 X |
| 3,224,881 | 12/1965 | Holtz | 426/510 |
| 3,675,902 | 7/1972 | Marshall | 23/290 X |
| 3,721,527 | 3/1973 | Lodige et al. | 21/56 |
| 3,769,900 | 11/1973 | Onarheim et al. | 99/348 |
| 3,884,636 | 5/1975 | Knoblauch et al. | 23/290 X |
| 3,928,642 | 12/1975 | Hubert et al. | 426/521 |

Primary Examiner—S. Leon Bashore
Assistant Examiner—Kenneth M. Schor
Attorney, Agent, or Firm—Sughrue, Rothwell, Mion, Zinn and Macpeak

[57] ABSTRACT

The invention provides a method and apparatus for the hydration and/or cooking of a particulate material, for example grain which is to be used as a nutrient medium for mycelium growth in the production of mushroom spawn, or food products such as peas, beans, rice, diced root vegetables or meat cut into small pieces.

The material is heat treated under pressure with water in liquid or vapour phase, then flash cooled and sterilized. Throughout these operations the material is agitated and the treated sterile material is fed into sterile containers under aseptic conditions.

6 Claims, 4 Drawing Figures

HEAT TREATING PARTICULATE MATERIAL

BACKGROUND OF THE INVENTION

This invention relates to heat treating particulate material, and in particular to hydration and/or cooking of a particulate material followed by sterilization in the container in which the hydration and/or cooking took place.

The invention is applicable in particular to the hydration and sterilization of a particulate material, for example grain, which is to be used as a nutrient medium for mycelium growth in the production of mushroom spawn.

Further the invention is applicable to the heat treatment of food products, for example vegetables such as peas and beans, diced root vegetable, rice or meat which has been cut into pieces.

SUMMARY

The invention provides a method of heat treating particulate material under pressure whilst it is being agitated. The material is heat treated with water in liquid or vapour phase, then flash cooled under reduced pressure, and sterilized; and is agitated while it is heat treated, sterilized and cooled. The treated sterile material is fed directly into a sterile container under aseptic conditions.

The particulate material is preferably treated in batches, and the preferred method comprises feeding a batch of particulate material into an autoclave, sealing the autoclave, feeding steam or water into the autoclave for a time to produce a predetermined degree of hydration of the material, and agitating the material in the autoclave while it is steam or water-treated and cooled.

The material in the autoclave may be agitated by means of a paddle mounted in the autoclave for rotation about an axis.

One method according to the invention comprises enclosing a batch of the material in a perforated container mounted for rotation in the autoclave, agitating the material by rotating the container during the heat treatment, sterilization and flash cooling, and discharging the material from the container uner aseptic conditions.

The method may also include, when cooking a particulate food product, for example meat or vegetables, condensing aromatics extracted from the autoclave during flash cooling, and returning those aromatics as required to the autoclave for admixture with liquors derived from the cooking of the food product.

The cooked product and liquors drained from the autoclave are preferably fed directly into a sterile container housed in an aseptic environment, and the container is sealed while it is in that environment.

Hydrated grain, for example rye, is used as a nutrient medium for the growth of mycelium in the production of mushroom spawn, and the invention further provides a method for the hydration of grain for use in the production of mushroom spawn, comprising heat treating with water a batch of grain while it is being agitated in the container, for a time sufficient to effect a predetermined degree of hydration of the grain, flash-cooling the hydrated grain while rotation continues, then adding a powder to the grain in the container and rotating the container to mix the powder with the grain so that the grain is coated and separated, feeding steam into the autoclave for a time sufficient to sterilize the coated grain, flash cooling the sterilized grain, feeding the sterile grain into a container under aseptic conditions, inoculating mycelium into the sterile grain, and then packing the inoculated grain into a sterile container which permits growth of the mycelium under incubation conditions.

In one method of operating the invention the mycelium is inoculated into the cooled sterile grain at a controlled rate while the grain is being fed at a controlled rate to the container.

The invention also provides apparatus for heat treating particulate material, comprising an autoclave having a sealable inlet and outlet for the material, supply means for water in liquid or vapour phase connected to the autoclave, vacuum means connected to the autoclave, agitating means mounted in the autoclave for rotation therein, and a discharge duct connected to the outlet for discharge of treated material under sterile conditions.

In one embodiment the agitating means comprises a paddle mounted on an axle which extends through a sealed bearing in the autoclave.

When the autoclave has a curved bottom, the paddle may be mounted on a horizontal axle, and be of flat, circular shape and may comprise a frame of circular form matching the shape of the curved bottom of the autoclave, and struts extending across the frame for cutting through material in the autoclave as the paddle rotates.

In another embodiment the agitating means may comprise a perforated container mounted within the autoclave on a horizontal axle which extends throuugh at least one sealed bearing in the side of the autoclave, the container has a mouth with a closure valve in the mouth, and the autoclave has an inlet opening in its roof for feeding of material into the container when it is positioned with its mouth uppermost, and a sealable outlet opening in its bottom for discharge of treated material from the container when its mouth is located above the outlet opening.

The perforated container may comprise a perforated basket which is mounted on an axle extending through the autoclave between sealed bearings, and one end of which is connected to driving means.

Further there may be in this embodiment a structure mounted centrally in the container around the axle so as to assist mixing of the material as the container is rotated.

In yet another embodiment the perforated container may comprise a framework in the form of a hollow Y, carrying perforated walls, one hollow arm of the Y being of different capacity from the other arm and the leg of the Y, and the container being located vertically in the autoclave on a horizontal axis which passes trhough the container in the region where the two arms of the Y join the leg of the Y.

In each embodiment of the apparatus a supply duct for steam may be connected through the bottom of the autoclave.

Further the autoclave may have an opening in its upper part connected by a duct to vacuum means. The vacuum means may include a condenser having a drain pipe connected back to the autoclave to return condensed liquid to the autoclave.

Preferably the discharge duct is connected through a seal into a sterilizable chamber containing conveyor means for conveying sterile containers beneath the duct for filling with the treated material.

In this embodiment the apparatus preferably includes sealing apparatus for sealing a filled container, mounted in the chamber above the conveyor means, and means in the chamber for advancing a filled container from a location beneath the discharge duct to a location beneath the sealing apparatus.

In another embodiment of the apparatus the discharge duct leads into one end of a sealed storage chamber, a feed conveyor extends through the chamber to feed treated material in the chamber to an outlet duct at the other end of the chamber which is connected to means for filling the material into containers.

Air lock valves may be mounted in the discharge duct to provide an air lock between the autoclave and the storage container.

Still further in this embodiment the outlet duct of the sealed storage container feeds one end of a metering tube containing a second feed conveyor, a mixing duct is connected to the other end of the metering tube for receiving a metered feed of the treated material, a feed tube containing a third feed conveyor leads into the mixing duct for feeding a metered flow of an inoculant into the metered treated material, and the lower end of the mixing duct is sealed into a sterilizable chamber for feeding the inoculated material into sterile containers in that chamber.

The invention further comprehends heat treated particulate material produced by the method described above. The heat treated particulate material may be a cooked sterile food product, or sterile hydrated grain suitable for use as a nutrient material for mycelium growth.

The invention still further includes sterile hydrated grain inoculated with mycelium for the production of mushroom spawn, produced by the method of the invention.

BRIEF DESCRIPTION OF THE DRAWINGS

Some embodiments of the invention will now be described, by way of example, with reference to the accompanying drawings in which.

DESCRIPTION OF THE PREFERRED EBODIMENTS

Figure 1:
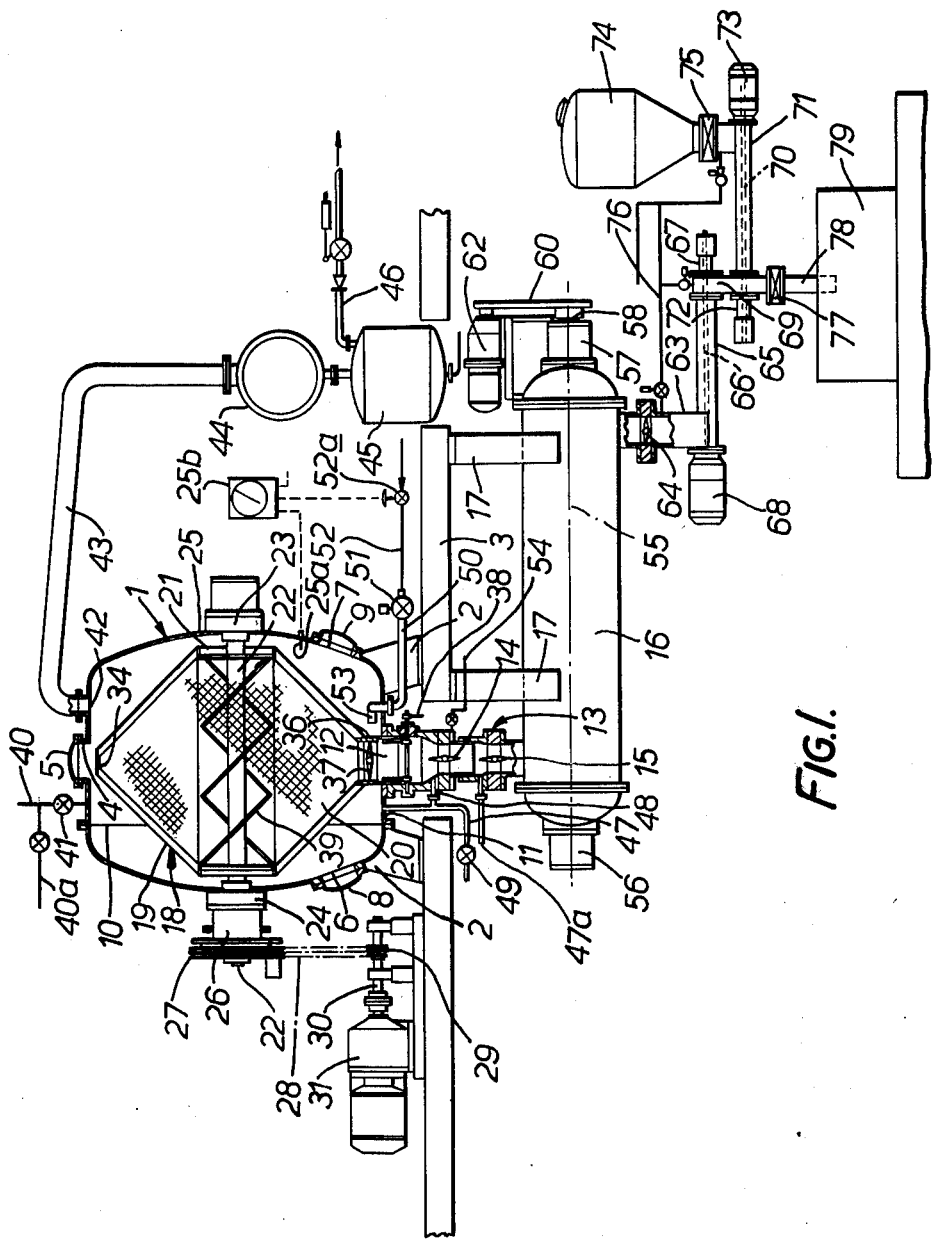
FIG. 1 illustrates, partly in section, apparatus according to the invention for producing sterile, hydrated grain into which mycelium is inoculated in the production of mushroom spawn.

Referring to the drawings, the apparatus illustrated in FIG. 1 is for the hydration and sterilization of grain to be inoculated with mycelium for subsequent incubation to produce mushroom spawn.

A fixed autoclave 1 is supported on legs 2 on a floor 3. The autoclave 1 is made from stainless steel, and has an inlet port 4 in its roof, which port is closed and sealed by a removable cap 5. The seal is produced between matching flanges at the top of the port 4 and on the cap 5.

Near the bottom of the sides of the autoclave 1 there are two ports 6 and 7 which are respectively closed by sealing caps 8 and 9. These ports 6 and 7 permit access to the autoclave for maintenance and cleaning.

The autoclave 1 is formed in two parts sealed together where indicated at 10, this construction permitting a perforated container, which is to be described, to be mounted within the autoclave.

In the centre of the floor 11 of the autoclave there is an outlet port 12 which leads to a discharge duct 13 in which an aseptic seal is defined between butterfly valves 14 and 15. The duct 13 leads into the top of one end of an elongated sterilizable storage chamber 16 which is suspended beneath the floor 3 by means of struts 17.

A perforated container 18 of hexagonal shape, when viewed in elevation, is mounted for rotation within the autoclave 1 about a horizontal axis. The container 18 has a framework 19 of stainless steel members which carry walls 20 of perforated stainless steel.

The central part 21 of the container is of cylindrical shape and is fixed on a horizontal axle 22 which is also of stainless steel and which passes through sealed bearings 23 and 24, of known kind, which are mounted on the outside of the side wall 25 of the autoclave 1.

At the left hand side of the autoclave, as indicated in FIG. 1, the axle 22 extends outwardly beyond the bearings 24 and passes through a fixed bearing block 26. A double-drive pulley 27 is fixed to the outer end of the axle 22 and belts 28 pass over the pulley 27 and also engage around a double driving pulley 29 which is fixed on a driving shaft 30 of an electric motor 31.

One apex of the perforated container 18 is closed as indicated at 34 and the other apex is open to form a mouth 36 which is closed by a butterfly valve 37. The container 18 is rotatable by driving the axle 22, and can be stopped with the mouth 36 immediately below the inlet port 4, or immediately opposite the outlet port 12 which leads to the discharge duct 13. This is the position of the container shown in FIG. 1.

When the mouth 36 is in the upper position immediately below the inlet port 4, the sealing cap 5 is removed and the butterfly valve 37 can be opened by suitable magnetic means from outside the autoclave so that a batch of particulate material to be processed, for example grain or other seeds, can then be fed into the perforated container. The gauge of the perforations in the walls of the container 20 is sufficiently small to prevent any leakage of the material from the perforated container into the autoclave 1. When the container is in the position shown in FIG. 1, a mechanism including a handle 38 can be operated from outside the duct 13 to regulate opening and closing of the valve 37 so that the processed contents of the container are discharged into the duct.

Mixing means are fixed centrally within the container as indicated by the stainless steel wire structure 39 which is mounted around the axle 22 in such a manner as to assist mixing of the grain as the container is rotated during processing. This structure 39 may be angular as shown or may take the form of two intertwined helices.

A line 40 which carries sterilized air is connected through a valve 41 to an opening in the roof of the autoclave. Another opening 42 in the roof is connected 44 which is itself connected through a reservoir 45 and a line 46 to a vacuum pump of known kind, not shown. A drain line 47 is connected to the floor of the autoclave 1 and is also connected by a branch 48 to an opening in a side wall of the duct 13 just above the butterfly valve 14. Valve means indicated at 49 are connected to the drain line 47. A valved drain line 47a is connected to the aseptic seal between the valves 14 and 15.

Another connection which passes through the floor of the autoclave 1 is a steam supply line 50 which is connected through a valve 51 to a source of high pressure steam on line 52. The line 50 is connected through the floor of the autoclave 1 to an outlet 53 located within the autoclave just above the floor but not in a position to impede rotation of the container 18. Steam under pressure is also supplied through a line 54 to the lock in the duct 13 between the two valves 14 and 15. The duct is as short as possible so as to minimise the amount of equipment which has to be maintained sterile.

For the processing of grain, for example rye, to be used as a nutrient medium for mycelium growth in the production of mushroom spawn, the container 18 is rotated until the mouth 36 is directly below the inlet port 4. The cap 5 is then removed, the valve 37 is opened, and the batch of rye to be processed is fed into the container 18. The size of the batch is such that the container 18 is about two-thirds full after hydration of the rye. The valve 37 is closed thus closing the container 18. The cap 5 is replaced and sealed down on to the port 4. Both butterfly valves 14 and 15 are closed to seal off the duct 13 and hot water admitted into the autoclave through a line 40a connected to the valve 41. As an alternative steam may be bubbled into water in the bottom of the autoclave to provide the hydration conditions required for heat treatment of the material in the container. The motor 31 is operated to rotate the container 18 at a speed of from 1 to 10 rm, usually 10 rpm when processing rye. The rye begins to cook and in the course of the cooking is hydrated. For example after such hydration at 262° F for 12 minutes and with the container rotating at 10 rpm the rye has a moisture content of about 50%.

A thermocouple 25a fixed in the autoclave is connected to a controller 25b which controls a valve 52a in the steam supply line so that the thermal conditions within the autoclave may be automatically controlled.

At the end of the hydration period the valve 51 is closed to cut off the supply of steam, when steam is being used, and the valve system 49 is opened to drain the autoclave. After draining the valve 49 is closed and the valve in the vacuum line 46 is open to put the vessel under vacuum which effects flash cooling of the hydrated grain. A pressure of about 10 cm of mercury is maintained within the autoclave for 10 minutes to effect sufficient flash cooling. At the end of this period the rye was in a condition in which it could be mixed with a powder, for example a chalk/gypsum mixture which coats the hydrated grains and maintains them separate.

After the flash cooling the mouth 36 of the container 18 is brought into register with the inlet port 4 in the roof of the autoclave. The vacuum valve in the line 46 is shut, and air is admitted through valve 41 to bring the pressure in the autoclave up to atmospheric pressure. The cap 5 is then removed and the valve 37 is opened and 6% by weight of a chalk/gypsum mixture is fed into the container 18. The cap 5 is closed after closing the butterfly valve 37 and the container is rotated at for example up to 10 rpm to mix the chalk/gypsum mixture thoroughly with the grain. The ratio of chalk to gypsum in the mixture is one part of chalk to four parts of gypsum.

When the hydrated grain is thoroughly coated so that the grains are separated, the autoclave 1 is again isolated, the container is rotated and steam is admitted through the valve 51 to sterilize the grain for 10 minutes at a temperature of 266° F.

The valve 51 is then closed to cut off the supply of steam and a vacuum is again applied to reduce the pressure within the vessel to about 5 cm of mercury. The vacuum is held for 20 minutes while rotation continues and flash cooling of the sterile grain takes place.

After this flash cooling the rye grains have a moisture content of 49% to 51%, a final temperature of 30° C to 35° C and a dry surface feel so that the processed rye flows freely.

The container 18 is brought to rest with the mouth 36 just above the outlet port 12. Sterile air is admitted through valve 41, the mechanism 3 is operated to open the valve 37, and the butterfly valves 14 and 15 are opened so that the processed rye grain flows from the container 18 into sterile storage chamber 16, the lock having been sterilized by steam on line 54.

When all the processed grain is in the chamber 16 the valves 14 and 15 are both closed and the container 18 is rotated to bring the entrance 36 into register with the port 4 in the autoclave ready for receiving the next batch of grain to be processed.

The storage chamber 16 has a feed conveyor, usually a feed screw, indicated at 55, which extends axially through the container between bearings 56 and 57. The feed screw 55 is mounted on a shaft 58 which extends through the bearing 57 and carries a pinion driven by a chain, which is located within a chain-guard 60, from a driving pinion mounted on the drive shaft of a motor 62.

An outlet duct 63 leads from the floor of the other end of the container 16. A butterfly valve 64 is mounted in the outlet duct. This valve is usually closed when a batch of processed grain is being fed into the chamber 16. The outlet 63 feeds one end of a metering tube 65 in which a feed conveyor, for example a feed screw 66 is mounted on a shaft 67 driven by a motor 68. Grain which is fed into the chamber 16 is traversed through the chamber by the feed screw 55 and a controlled feed of grain through the duct 63 is further metered by the feed screw 66 in the tube 65 which feeds the grain towards a mixing duct 69 into which metered flow of mycelium inoculant is fed by a further conveyor, for example a feed screw 70 in a horizontal feed tube 71. The feed screw 70 is driven by a motor 73, and an inlet to the feed tube 71 is connected to the outlet mouth of a hopper 74 which contains the inoculum, the supply of which is controlled by a valve 75. Steam lines, not shown are connected to the duct 63, the mixing duct 69, and the hopper outlet so that sterilization can be carried out by steam. Also a supply of sterilized air is available.

In the mixing duct 69 inoculum is mixed with the metered flow of hydrated grain under sterile conditions, and the inoculated grain flows through a valve 77 to an outlet duct 78 which is sealed into an aseptic chamber 79. The inoculated grain is then packed into sterile bags in the chamber 79, the bags are sealed, and they are stored under controlled conditions for growth of mycelium through the whole of the grain to produce mushroom spawn.

The duct 78 may lead directly to a bag filling arrangement of known kind in which the sterile bags are filled directly from the duct 78.

The hydration process with flash cooling and mixing with the powder ensures that the hydrated grain has good flow properties so that it is metered readily through the plant and addition of the inoculant is easily achieved.

The hydration of the grain while it is cooked in the pressure vessel 1 is greatly enhanced by the rotation of the perforated container and by the mixing structure 39 centrally mounted around the axle 22 in the container.

Figure 2:
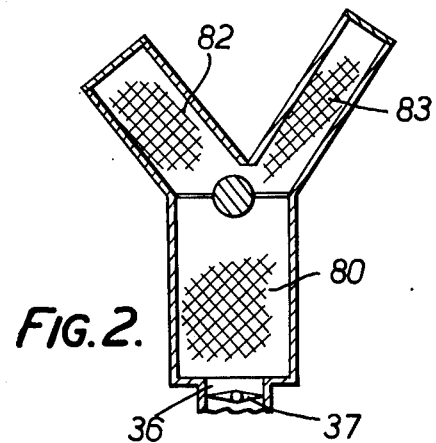
FIG. 2 illustrates a modification of the apparatus of FIG. 1.

An alternative form of the perforated container is illustrated in FIG. 2. The container comprises a stainless steel framwork in the form of a hollow Y, carrying walls of perforated stainless steel. The base leg 80 is relatively wide and the Y has two arms 82 and 83 of different capacities as illustrated. The container is mounted vertically in the autoclave on a horizontal axle 22 which passes through the container in the region of the junction of the limbs 82 and 83 and the base leg 80. The mouth 36 is at the end of the leg 80, and when the batch has been fed into this container and it rotates, for example at 10 rpm, the batch of particulate material is tumbled during rotation and each time it falls from the base 80 into the two limbs 82 and 83 it is divided unequally so that there is efficient mixing to ensure even hydration, flash cooling and powder distribution.

The apparatus described with reference to FIGS. 1 and 2 can be used for the processing of other particulate materials for example food products. Rice, peas, beans, diced root vegetables or meat cut into pieces can be fed in batches into the container 18 and pressure cooked in the sealed autoclave as the food product is rotated in the container. Liquors derived from the cooking collect in the bottom of the autoclave, and in the condenser 44 when the products are flash cooled while agitation in the rotating container 18 continues. Aromatics which are condensed in the condenser 44 can be saved and mixed back into the product or into the liquors drained from the autoclave.

Figure 3:
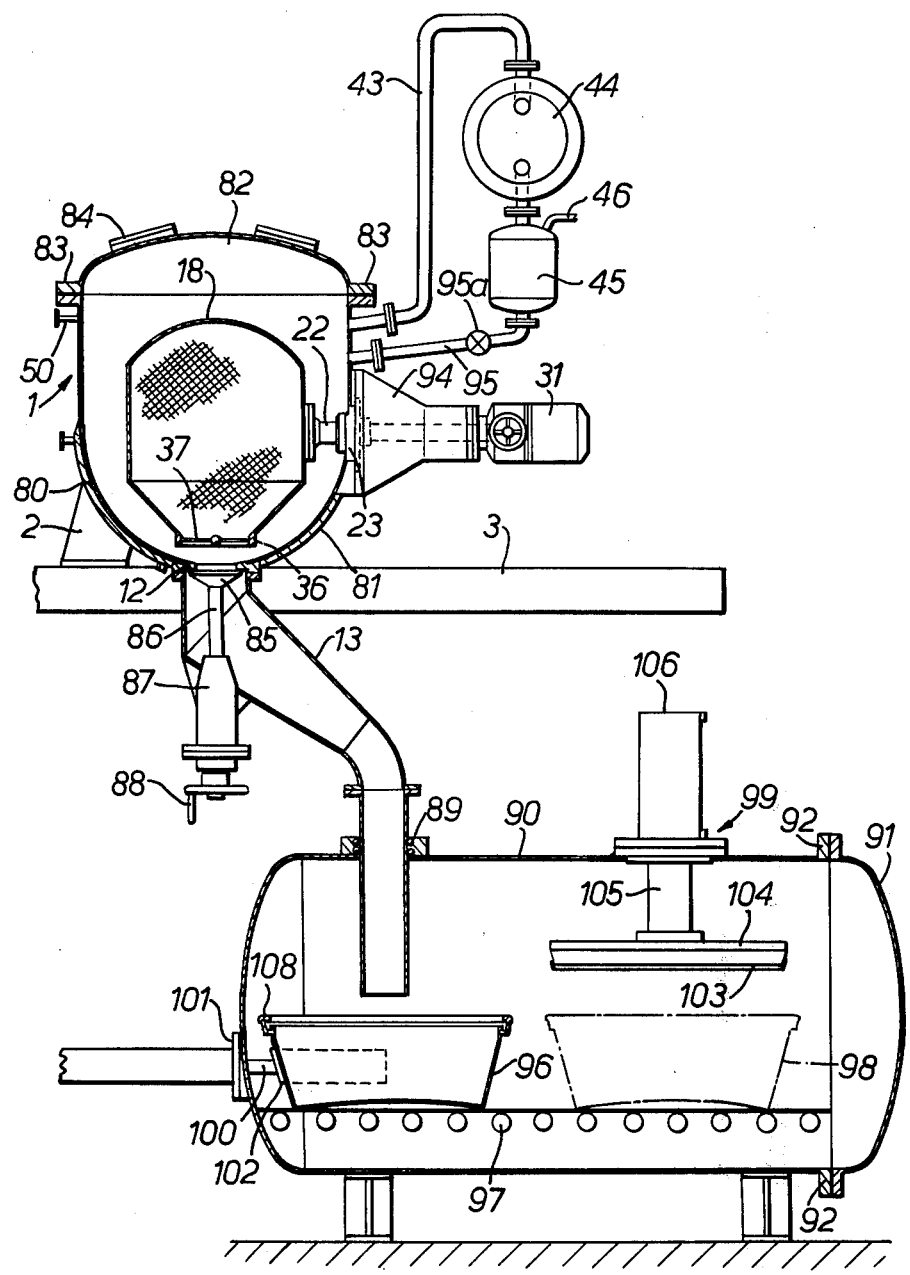
FIG. 3 is a view similar to FIG. 1 of apparatus according to the invention for cooking particulate food products and sealing the cooked products into sterile containers under aseptic conditions.

FIG. 3 illustrates apparatus according to the invention which is particularly adapted for the cooking of particulate food products and also includes an arrangement for sealing the cooked products into sterile containers under aseptic conditions. The autoclave 1 is shaped as a pressure cooking vessel with a curved bottom 80 which is supported in a cradle 81 mounted on the legs 2 standing on the floor 3. The autoclave has a hinged roof 82 with a seal between mating flanges 83 on the roof and on the main body of the autoclave. There are ports 84 in the roof to give access to the autoclave and the discharge duct 13 leads from the outlet port 12 in the bottom of the autoclave. The port 12 is closed by a valve member 85 mounted on the end of a rod 86 which is threaded at its lower end and engages with an internal thread on a nut member 87 which is fixed to the discharge duct. A manually operable wheel 88 is mounted on the bottom of the rod 86 and the valve member 85 is moved into and out of sealing engagement with the outlet opening 12 by turning the wheel 88.

The discharge duct 13 is knee-shaped and is connected through a seal 89 into a chamber 90 which can be sterilized so as to maintain a sterile environment. The chamber is within a casing closed at one end by a closure 91 which can be hinged away from the end of the chamber 90. So as to provide sterile conditions within the chamber 90 sealing flanges 92 on the chamber body and on the chamber end 91 co-operate in usual manner. The perforated container 18 is a perforated stainless steel basket which is mounted within the autoclave 1 on one end of a horizontal shaft 22 which extends through a sealed bearing 23 in the side wall of the autoclave. The shaft is driven by a motor 31 which is mounted on legs 94 fixed to the side wall of the autoclave. The container has a mouth 36 closed by a butterfly valve 37.

Food products to be processed are fed into the container 18 when it is in an upright position with the mouth 36 uppermost, the roof 82 of the autoclave being opened to permit feeding of the batch of food products into the container. The supply duct 50 for steam is connected through a side wall of the autoclave and a drain pipe 95 leads through a three-way valve 95a, which acts as a diversion valve, from the reservoir 45 connected to the vacuum system, back into the autoclve so that liquid condensed in the condenser 44 and draining through the reservoir 45, including condensed aromatics extracted from the autoclave during the flash cooling of the cooked products, may be returned to the autoclave as required for admixture with the liquors derived from the cooking of the food product. The liquors drain through the discharge duct 13 when the valve member is lowered from the outlet port 12.

The food products are cooked during a period of rotation under the effect of steam under pressure followed by flash cooling. The butterfly valve 37 is opened when the mouth 36 is in its lowermost position, the valve member 85 is withdrawn and the cooked products with liquors fall through the discharge duct into a sterile container 96 which is housed in the chamber 90 beneath the discharge duct. The container 96 rests on a conveyor 97 and when it has received the batch of cooked products it is pushed along the conveyor from its location as shown beneath the discharge duct to a location, indicated at 98, beneath sealing apparatus 99.

The container is pushed along the conveyor by a pusher rod 100 which extends through a seal 101 in the end of the container and which carries a fork 102 which engages around the container.

The container is of the kind described in United Kingdom Patent Application No. 2402/75 and can be easily sealed by insertion of a sealing lid by means of the sealing apparatus 99. The container 96 is of shallow rectangular form and its upper end is formed with a rim which is shaped so as to interlock with a rectangular metal closure 103 which is held magnetically to a plunger 104 mounted on the end of a piston rod 105 which is itself movable in a cylinder 106 mounted on top of the chamber 90. The main body of the container is of stainless steel and a rim 108 of gasket material for example a natural or synthetic rubber, or stainless steel encircles the upper end.

When the container 96 is in position 98 the plunger 104 is pressed downwardly which presses the closure 103 down beneath a shoulder on the rim so that it seals the container. This sealing of the container is in the sterile environment within the chamber 90 and the end 91 can then be opened and the container removed. A connection for supplying steam to the interior of the chamber 90 is provided to re-sterilize the chamber after the next container to be filled has been loaded. The steam connection and a drain connection are not shown in the drawing.

Figure 4:
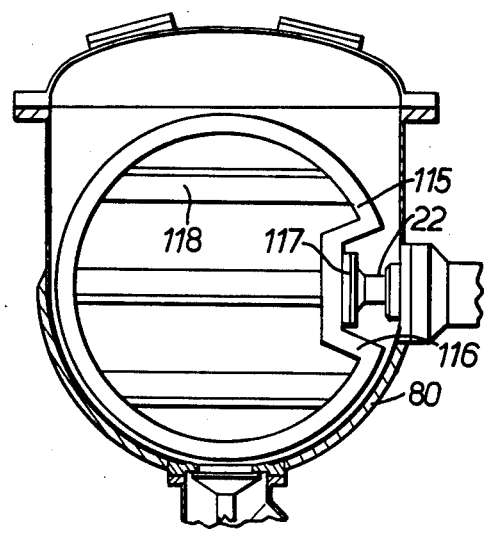
FIG. 4 illustrates a modification of the apparatus of FIG. 3 with a paddle for agitating the products being cooked.

FIG. 4 illustrates a modification of the apparatus of FIG. 3. The autoclave 1 has the same shape as in FIG. 3 but the particulate food products to be processed are fed directly into the autoclave rather than into a perforated container.

The material in the autoclave is agitated by means of a paddle mounted in the autoclave for rotation about a horizontal axis. The paddle is of flat circular shape, and comprises a stainless steel frame 115 of circular form which matches the shape of the curved bottom 80 of the autoclave. At one side the frame 115 is formed with a recess 116 and the horizontal axle 22 extends into the recess 116 and is fixed to the frame 115 by a mounting plate 117. The paddle also has horizontal stainless steel struts 118 which extend across the frame 115 and which agitate the particulate material being cooked in the autoclave as the paddle rotates about its horizontal axis.

Rotation of the paddle for example at 10 rpm serves to agitate the food product while it is steam treated and also during the subsequent flash cooling.

The invention thus provides an improved method and apparatus for producing an aseptic particulate product in a large vessel, avoiding the problem of slow heat transfer through the product by agitation throughout the processing. In particular the invention provides a method and apparatus for the production of aseptic inoculated particulate nutrient material for the production of mushroom spawn, the packing of the aseptic inoculated hydrated material into sterile containers in which mycelium growth is to take place, being carried out under aseptic conditions.

The apparatus has facility for isolating the stages of the process from each other so that batches of material to be treated can follow each other in rapid succession through the apparatus and a batch of nutrient material, for example rye, can be cooked in the autoclave while a previous batch is being inoculated with mycelium and packed.

I claim:

1. A method of heat treating particulate food or other grain material comprising:
    a. supplying batch of particulate food or other grain material to be treated into an autoclave;
    b. sealing the autoclave;
    c. supplying water in liquid or vapour phase into the autoclave at a sufficient temperature and for a sufficient time to hydrate and sterilize the particulate material;
    d. applying vacuum to the autoclave to effect flash cooling of the hydrated material;
    e. agitating the material in the autoclave while it is hydrated, sterilized and flash-cooled; and
    f. directly feeding the sterilized treated material from the autoclave into a sterile container under aseptic conditions.

2. A method according to claim 1, wherein said agitating of the material in the autoclave comprises agitating by means of a paddle mounted in the autoclave for rotation about an axis.

3. A method according to claim 1, wherein the agitating of the material comprises enclosing a batch of the material in a perforated container mounted for rotation in the autoclave and rotating the container.

4. A method of cooking a particulate food material comprising:
    a. supplying a batch of particulate food material into an autoclave;
    b. sealing the autoclave;
    c. supplying water in liquid or vapour phase into the autoclave at a sufficient temperature and for a sufficient time to cook and sterilize the food material;
    d. applying vacuum to the autoclave to flash-cool the cooked food material.
    e. condensing aromatics extracted from the autoclave during the flash cooling, and returning those aromatics as required to the autoclave for admixture with liquors derived from cooking of the food material;
    f. agitating the food material in the autoclave while it is cooked, sterilized and flash-cooled;
    g. directly feeding the cooked sterilized food material and liquors drained from the autoclave into a sterile container housed in an aseptic environment; and
    h. sealing the container while it is in that environment.

5. A method for the hydration of grain for use in the production of mushroom spawn comprising:
    a. supplying a batch of grain into an autoclave;
    b. sealing the autoclave;
    c. supplying water in liquid or vapour phase into the autoclave at a sufficient temperature and for a sufficient time to effect a predetermined degree of hydration and sterilization of the grain;
    d. agitating the grain in the autoclave while it is hydrated and sterilized;
    e. flash-cooling the hydrated grain in the autoclave while agitation continues;
    f. adding a powder to the flash-cooled hydrated grain and continuing said agitation to mix the powder with the grain so that the grain is coated and separated;
    g. feeding steam into the autoclave for a time sufficient to sterilize the coated grain;
    h. flash cooling the sterilized grain;
    i. continuing agitation of the grain in the autoclave during the sterilization and flash-cooling of steps (g) and (h);
    j. removing the cooled sterile grain from the autoclave under aseptic conditions;
    k. inoculating mycelium into the cooked sterile grain; and
    l. then packing the inoculated grain into a sterile container which permits growth of the mycelium under incubation conditions.

6. A method according to claim 5, wherein the mycelium is inoculated into the cooled sterile grain at a controlled rate while the grain is being fed at a controlled rate to the container.

* * * * *